May 30, 1933.   W. H. BACHELDOR ET AL   1,911,486
HOSE COUPLER
Filed April 9, 1931

Inventors:
William H. Bacheldor
Amiel Brummer

By Bruce K. Brown Atty.

Patented May 30, 1933

1,911,486

UNITED STATES PATENT OFFICE

WILLIAM H. BACHELDOR AND AMIEL BRUMMER, OF WOOD RIVER, ILLINOIS, ASSIGNORS TO STANDARD OIL COMPANY, OF CHICAGO, ILLINOIS, A CORPORATION OF INDIANA

HOSE COUPLER

Application filed April 9, 1931. Serial No. 528,789.

This invention relates to a hose coupler, and it pertains more particularly to a means for clamping and locking a high pressure hose to a pipe.

The object of this invention is to provide a simple fixture and system of clamps whereby a hose will be securely locked on a pipe against strains which might cause the hose to be pulled therefrom when a single clamp is used. A further object is to provide improved means for locking or "cramping" a plurality of clamps on a pipe. Other objects will be apparent from the following detailed description.

In practicing our invention we may insert a hose over a pipe, tighten clamps on said hose at spaced points, and lock said clamps against different sides of the hose by means of ties which are held under tension between one side of each clamp and a fixed base.

The invention is illustrated in the accompanying drawing wherein similar parts are designated by like referenece characters in the several views and wherein Figure 1 is a plan of our improved coupler with portions of the hose cut away to show the pipe.

Figure 1:
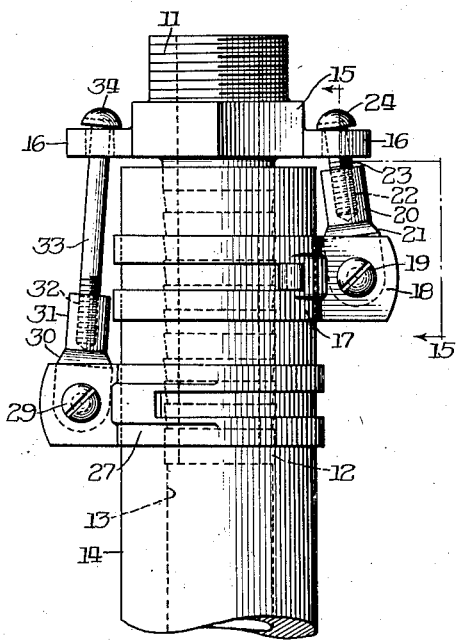
Figure 3:
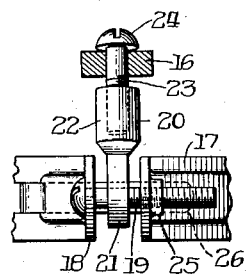
Figure 3 is a detail elevation showing our means for locking the clamp to the base.
Figure 4:
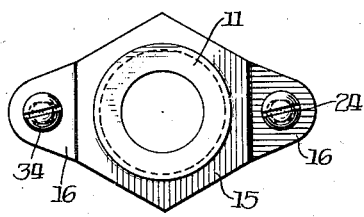
Figure 4 is a detail plan of the base.
Figure 2:
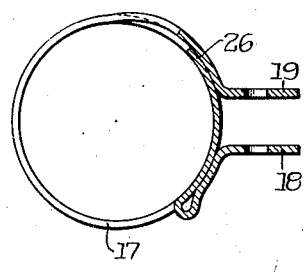
Figure 2 is a detail of a clamp.

Referring to Figure 1, the hollow fixture is provided with a threaded portion 11 so that it may be screwed into the end of an internally threaded pipe, faucet, valve casing or the like. Opposite the threaded portion 11 we provide a pipe 12 which is preferably serrated or provided with annular teeth for engaging the inner side 13 of the hose 14. Between threaded portion 11 and pipe 12 we provide a base 15 which is, in turn, provided with spaced lugs 16.

We surround the hose 14 by a clamp 17, which may be a flexible metal strip provided with upturned ends 18, the length of the strip being less than the circumference of the hose, so that space will be left between said ends 18. The ends 18 of the clamp are drawn toward each other by means of a bolt 19. The clamp per se forms no part of our present invention and it will therefore not be described in detail.

A tie 20 is interposed between lug 16 and bolt 19. This tie may consist of a relatively flat bearing member 21 pivoted on bolt 19 and adapted to turn freely thereon when the ends 18 are securely clamped. Bearing member 21 terminates in an upper internally threaded portion 22 adapted to receive threaded screw 23, the head 24 of which is supported by lug 16. The operation of this mechanism may be described as follows: The hose 14 is inserted on pipe 12, clamp 17 is placed around the hose, ends 18 of the clamp are pulled toward each other by nut 25, the portion of the hose between ends 18 being protected by tongue 26, and tension is placed on the tie 20 by the tightening screw 23 in the threaded aperture 22. When the tie is placed under tension the clamp locks or "cramps" the hose against the pipe; the tie turns the clamp at such an angle that a force tending to pull the hose from the pipe will only increase the effect of the locking means and therefore hold the hose more firmly against the annular teeth of said pipe.

If instead of a direct pull, a lateral pull is exerted on the hose, the effect may be to decrease instead of increase the cramping or locking action. In order to overcome this difficulty we provide another clamp 27 spaced from the first clamp 17. The ends 28 of clamp 27 are diametrically opposed to the ends 18 of the first clamp, and the bolt 29, which pulls the ends 28 together, acts as a pivot for bearing member 30 of the tie 31. This bearing member terminates in an upper threaded portion 32 adapted to cooperate with the threads on screw 33, and the screw head 34 rests on a lug 16', which is diametrically opposed to lug 16.

It is essential that clamp 17 be spaced from clamp 27, because if these clamps are too close together the tightening of tie 31 will neutralize the effect of tie 20 in locking clamp 17. When these clamps are spaced as shown in Figure 1, and their respective ties are placed under tension, both sides of the hose will be locked so that a strain in either direction will tend to increase the grip of the locking means or, in other words, to increase the tenacity with which the hose is held against the annular teeth on the inner pipe.

Figure 5:
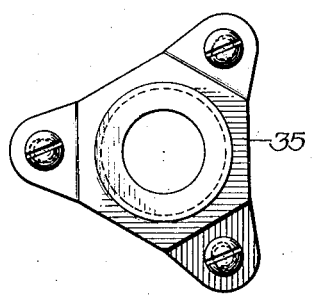
Figure 5 is a detail plan of a modified base structure.

Instead of using two spaced clamps and diametrically opposed ties we may use three spaced clamps with ties at 120° intervals, using a fixture base 35 as illustrated in Figure 5.

While we have shown a screw co-acting with a threaded member as a preferred embodiment of our tie, it is understood that this is by way of example only and that any equivalent means may be used to exert tension between the fixed base and one side of the clamp. The term "base" as used herein and in the accompanying claims refers to an element or structure which is in fixed position with respect to the pipe 12.

If it is desired to couple two hoses together, a pipe may be used in place of the threaded portion 11 and a plurality of additional lugs may be provided on base 15 to cooperate with ties for locking clamps on this other inner pipe.

Our invention is particularly applicable to high pressure systems or to systems wherein there is a tendency for the hose to be pulled off the pipe. While we have described a preferred embodiment of our invention in detail, it is understood that we do not limit ourselves to said details except as defined by the following claims.

We claim:

1. In a fixture of the type described, means for connecting said fixture to a conduit, a base, a pipe provided with a hole which extends through said first named means, a plurality of spaced clamps for holding the hose against said pipe, means between one clamp and the base for cramping said clamp to lock the hose on the pipe, and separate means peripherally spaced from said first means and interposed between said other clamp and said base for cramping said other clamp whereby the hose will be locked against strains in different directions.

2. In combination, a hollow pipe, a base in fixed relation to said pipe, a plurality of spaced clamps for holding a hose on said pipe, and means interposed between said base and said clamps for cramping the clamps against the hose in different directions.

3. In combination, a hose, a pipe for fitting in the end of said hose, spaced clamps for holding said hose against said pipe, a fixed base, lugs on said base, a single tie between one of the lugs and one of the clamps, and another single tie between another of said lugs and another of said clamps, the ties being circumferentially spaced from each other.

4. The combination of claim 3 wherein the ties include means for exerting tension therein.

5. In combination a fixture having a pipe and a fixed base, a hose clamp having two ends, means for pulling the ends of said clamp toward each other, a tie pivoted on said means, and means for tensioning said tie against the fixed base to cramp said clamp to lock a hose on said pipe.

6. A hose coupler comprising a pipe, a base extending laterally from said pipe, a clamp for holding a hose on said pipe, and means for cramping the clamp against the hose, said means comprising a single lateral extension on said clamp, a tie member between said clamp and said base, and means for varying the effective length of the tie member whereby the lateral extension on the clamp may be drawn toward the base, thereby causing the opposite edges of the clamp to grip the hose, the tightness of the grip being varied by varying the effective length of the tension member.

In witness whereof we have affixed our signatures.

WILLIAM H. BACHELDOR.
AMIEL BRUMMER.